(12) United States Patent
Kim (10) Patent No.: US 8,602,853 B2
(45) Date of Patent: Dec. 10, 2013

(54) AIR FILTER ASSEMBLY OF BLOWER FOR VEHICLE

(75) Inventor: Myung Hoe Kim, Whasung-Si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 723 days.

(21) Appl. No.: 12/775,280

(22) Filed: May 6, 2010

(65) Prior Publication Data

US 2011/0136426 A1 Jun. 9, 2011

(30) Foreign Application Priority Data

Dec. 4, 2009 (KR) .................... 10-2009-0119873

(51) Int. Cl.
*B60H 3/06* (2006.01)
(52) U.S. Cl.
USPC .......................... 454/158; 454/139; 454/162
(58) Field of Classification Search
USPC .......................... 454/139, 158, 162
See application file for complete search history.

(56) References Cited

U.S. PATENT DOCUMENTS

| | | | | |
|---|---|---|---|---|
| 4,765,230 A | * | 8/1988 | Soethout et al. | 454/139 |
| 5,105,731 A | * | 4/1992 | Kraus | 454/143 |
| 5,254,033 A | * | 10/1993 | Brauen et al. | 454/146 |
| 6,428,409 B1 | * | 8/2002 | Egami et al. | 454/139 |
| 8,002,615 B2 | * | 8/2011 | Jeong et al. | 454/139 |
| 2007/0238406 A1 | * | 10/2007 | Jeong et al. | 454/139 |
| 2010/0009620 A1 | * | 1/2010 | Kawato et al. | 454/241 |

* cited by examiner

*Primary Examiner* — Steven B McAllister
*Assistant Examiner* — Jamil Decker
(74) *Attorney, Agent, or Firm* — Morgan, Lewis & Bockius LLP (57) ABSTRACT

An air filter assembly of a blower for a vehicle may include an air filter casing installed in an intake duct having an outdoor air intake port communicating with the outdoor of the vehicle, an indoor air intake port communicating with the indoor of the vehicle, and a subsidiary indoor air intake port communicating with the indoor of the vehicle, wherein the subsidiary indoor air intake port is provided in the air filter casing. an air filter received in the air filter casing and purifying indoor air or outdoor air supplied into the intake duct, and an air guide integrated with an end of the air filter and selectively opening or closing the subsidiary indoor air intake port so as to guide a predetermined amount of indoor air into the intake duct during an outdoor air inlet mode.

6 Claims, 8 Drawing Sheets

AIR FILTER ASSEMBLY OF BLOWER FOR VEHICLE

CROSS-REFERENCE TO RELATED APPLICATION

The present application claims priority to Korean Patent Application No. 10-2009-0119873, filed on Dec. 4, 2009, the entire contents of which is incorporated herein for all purposes by this reference.

BACKGROUND OF THE INVENTION

1. Field of the Invention

The present invention relates, in general, to an air filter assembly of a blower for vehicles and, more particularly, to an air filter assembly of a blower for vehicles, which is fabricated using a small number of elements, reduces the energy consumption and increases heating efficiency when heating the passenger compartment of a vehicle.

2. Description of the Related Art

Generally, an air conditioner for vehicles heats or cools indoor air inside the passenger compartment of a vehicle or outdoor air, which is atmospheric air, and supplies the heated or cooled air into the passenger compartment, thus controlling the temperature inside the passenger compartment. The air conditioner for vehicles includes an air conditioner casing having therein both a heater core for heating the indoor or outdoor air and an evaporator for cooling the air, and a blower for supplying air into the air conditioner casing.

Figure 1:
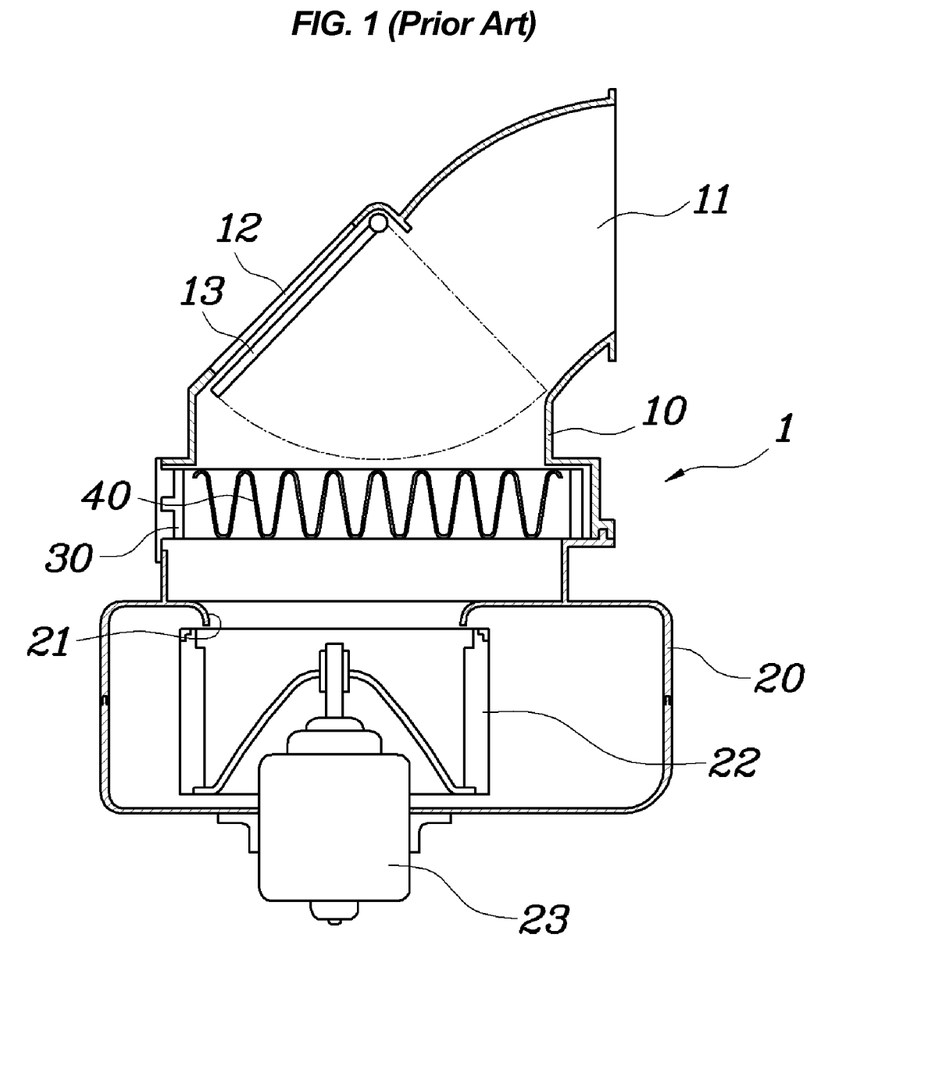
FIG. 1 is a view illustrating a conventional blower for vehicles.

FIG. 1 is a view illustrating a conventional blower for vehicles. As shown in FIG. 1, the blower 1 for vehicles comprises an intake duct 10 provided both with an indoor air intake port 12 for supplying indoor air and with an outdoor air intake port 11 for supplying outdoor air, and a scroll casing 20 provided therein with a blower fan 22 for forcibly feeding the indoor and outdoor air into the air conditioner casing.

In the intake duct 10, both an indoor and outdoor air control door 13 for selectively opening the outdoor air intake port 11 or the indoor air intake port 12 and an air filter casing 30 receiving an air filter 40 therein are installed. Further, a motor 23 for rotating the blower fan 22 is coupled to the blower fan 22.

When a user selects a heating mode to heat the passenger compartment of a vehicle, the user can select indoor air or outdoor air as the air which is to be fed into the blower 1. When the user selects an outdoor air inlet mode in consideration of an indoor environment of the vehicle, the indoor and outdoor air control door 13 closes the indoor air intake port 12 and opens the outdoor air intake port 11. When the blower fan 22 is operated in the above state, outdoor air is supplied into the intake duct 10 through the outdoor air intake port 11. The inlet outdoor air flows into the scroll casing 20 through the bell mouth 21 of the scroll casing 20 and is forcibly fed into the air conditioner casing.

However, when cool outdoor air is supplied into the air conditioner casing through the outdoor air intake port 11 during the heating mode, an excessive amount of energy must be required to heat the passenger compartment to a desired temperature, thus reducing heating efficiency of the air conditioner.

Figure 2:
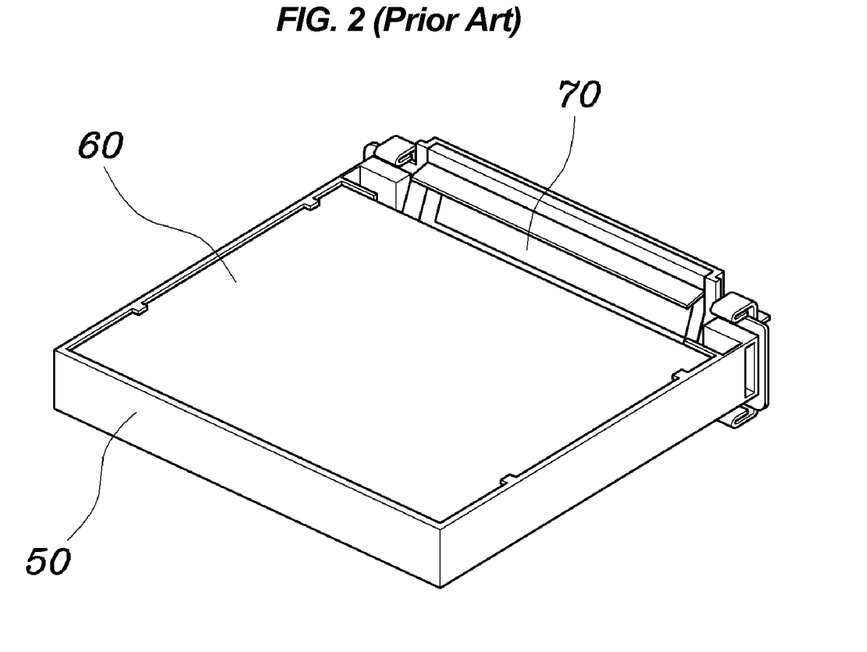
FIG. 2 is a view of another conventional blower for vehicles having an improved construction.
Figure 3:
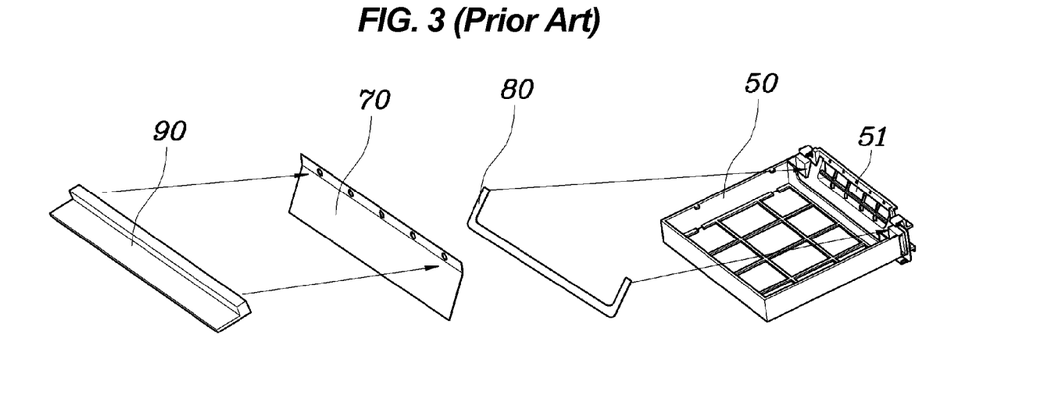
FIG. 3 is a perspective view illustrating the construction of an air filter casing used in the conventional blower for vehicles having the improved construction.
Figure 4:
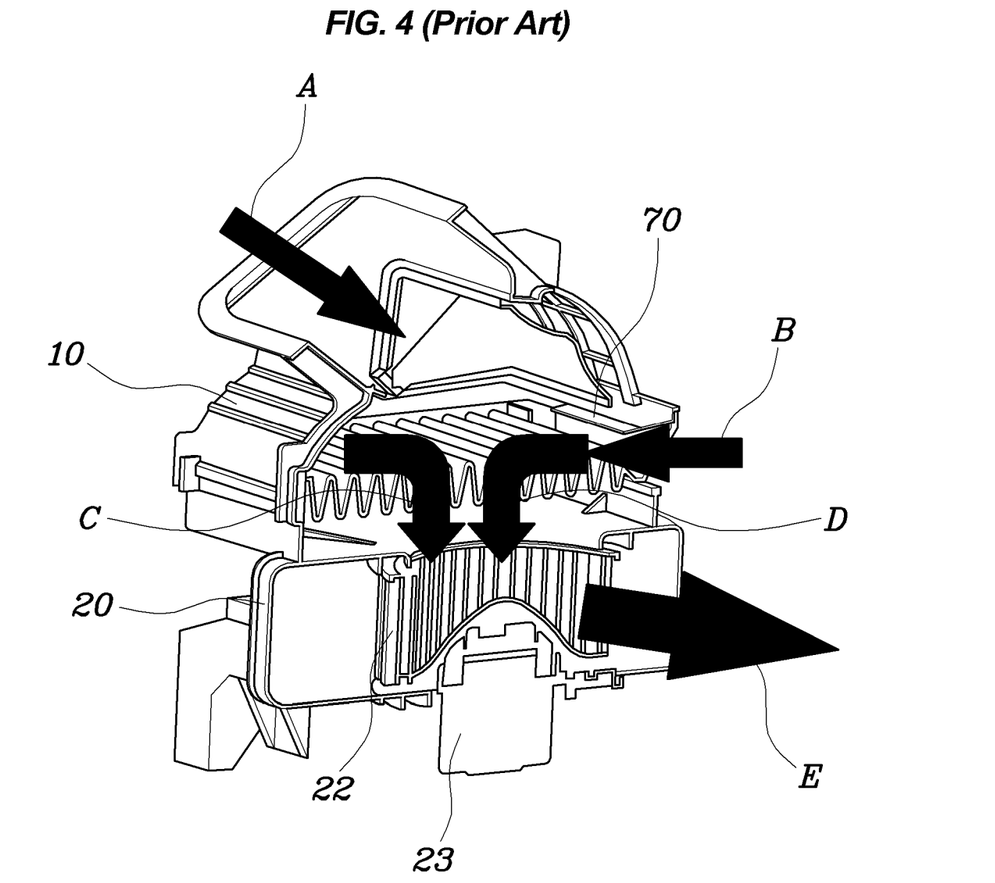
FIG. 4 is an exploded perspective view illustrating the construction of the air filter casing used in the conventional blower for vehicles having the improved construction.

In an effort to solve the above-mentioned problem, a blower having an improved construction as shown in FIG. 2 through FIG. 4 has been proposed. As shown in FIG. 2 through FIG. 4, the conventional blower having the improved construction is configured such that, during outdoor air inlet mode, in which outdoor air is supplied into the intake duct 10 in the direction of the arrow A, a predetermined amount of indoor air is supplied into the intake duct 10 in the direction of the arrow B through a subsidiary indoor air intake port 51 provided in an air filter casing 50 having an air filter 60 therein and, thereafter, the outdoor air and the indoor air, which have been supplied into the intake duct 10, flow into the scroll casing 20 in respective directions of the arrows C and D and, thereafter, mixed air prepared by the combination of the outdoor air with the indoor air is supplied into the air conditioner casing by a blower fan 22 in the direction of the arrow E.

In the above state, when there is no difference between indoor pressure and outdoor pressure of the intake duct 10, the subsidiary indoor air intake port 51 of the air filter casing 50 is maintained in a closed state by a subsidiary door 70 of the air filter casing 50. However, when there is a difference between the indoor pressure and the outdoor pressure of the intake duct 10, the subsidiary indoor air intake port 51 of the air filter casing 50 is maintained in an open state by the subsidiary door 70 of the air filter casing 50.

However, when the subsidiary door 70 is installed in the air filter casing 50 as described above, the subsidiary door 70 may generate noises because of the interference between the air filter casing 50 and the subsidiary door 70 during operation. In order to remove the noises, a flap 80 is installed on a first side of the subsidiary door 70. Further, a shaking prevention frame 90 is installed on a second side of the subsidiary door 70 so as to remove noises, which may be generated by shaking of the subsidiary door 70.

However, the above-mentioned conventional blower having the improved construction requires an excessive number of elements, thus having a complicated construction and increasing the production costs of vehicles and requiring that a long time be spent assembling the vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an air filter assembly of a blower for vehicles, in which an air guide used for controlling the subsidiary indoor air intake port is integrated with an air filter into a single body, thus reducing the amount of energy required to heat the passenger compartment, increasing heating efficiency and minimizing the number of additional elements, thereby reducing the production cost and increasing productivity of vehicles.

In one aspect of the present invention, the air filter assembly of a blower for a vehicle, may include an air filter casing installed in an intake duct having an outdoor air intake port communicating with the outdoor of the vehicle, an indoor air intake port communicating with the indoor of the vehicle, and a subsidiary indoor air intake port communicating with the indoor of the vehicle, wherein the subsidiary indoor air intake port is provided in the air filter casing. an air filter received in the air filter casing and purifying indoor air or outdoor air supplied into the intake duct and an air guide integrated with an end of the air filter and selectively opening or closing the subsidiary indoor air intake port so as to guide a predetermined amount of indoor air into the intake duct during an outdoor air inlet mode.

The air filter casing may be provided in an end thereof with an inclined part inclined upwards at a predetermined angle and the subsidiary indoor air intake port is provided in the inclined part, wherein the predetermined angle is an acute angle.

The air guide may be disposed between the air filter and the inclined part of the air filter casing and moves in contact or noncontact with the inclined part, thus closing or opening the subsidiary indoor air intake port.

In another aspect of the present invention, the air guide may be monolithically integrated with a lower edge of the end of the air filter with an elasticity to close the subsidiary indoor air intake port while a difference between indoor pressure and outdoor pressure of the intake duct is below a predetermined amount, wherein the air guide rotates around a lower edge of the end of the air filter so as to be in contact or noncontact with the inclined part according to the difference between the indoor pressure and the outdoor pressure of the intake duct.

In the other aspect of the present invention, the air guide may be pivotally coupled to the end of the air filter to close the subsidiary indoor air intake port with a weight of the air guide while a difference between indoor pressure and outdoor pressure of the intake duct is below a predetermined amount, wherein the air guide rotates around a lower edge of the end of the air filter so as to be in contact or noncontact with the inclined part according to the difference between the indoor pressure and the outdoor pressure of the intake duct.

The air guide may be made of a nonwoven fabric material.

According to the air filter assembly of a blower for vehicles of the present invention, the air guide for controlling the subsidiary indoor air intake port is integrated with the air filter into a single structure, thus reducing the amount of energy required to heat the passenger compartment, increasing heating efficiency and minimizing the number of additional elements, thereby reducing the production cost and increasing productivity of vehicles.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 5:
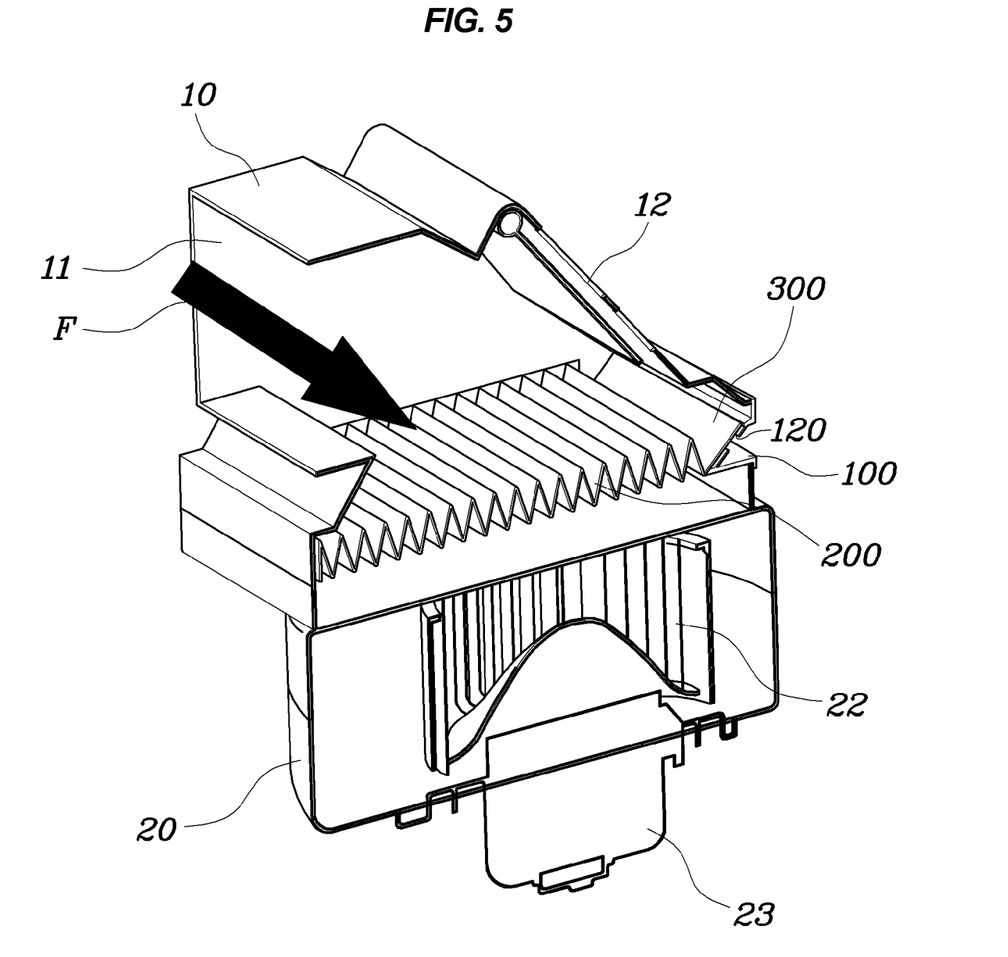
FIG. 5 is a view illustrating an exemplary air filter assembly of a blower for a vehicle according to the present invention.
Figure 6:
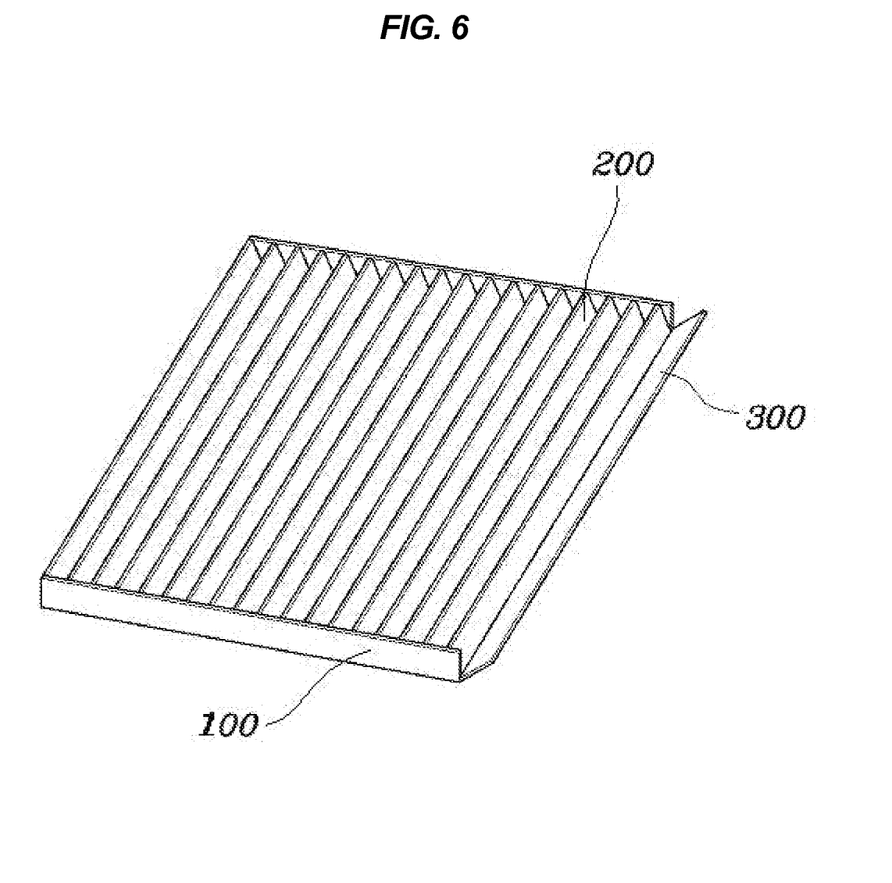
FIG. 6 is a perspective view illustrating an important part of an air filter cover used in the exemplary air filter assembly of the blower for vehicles according to the present invention.
Figure 7:
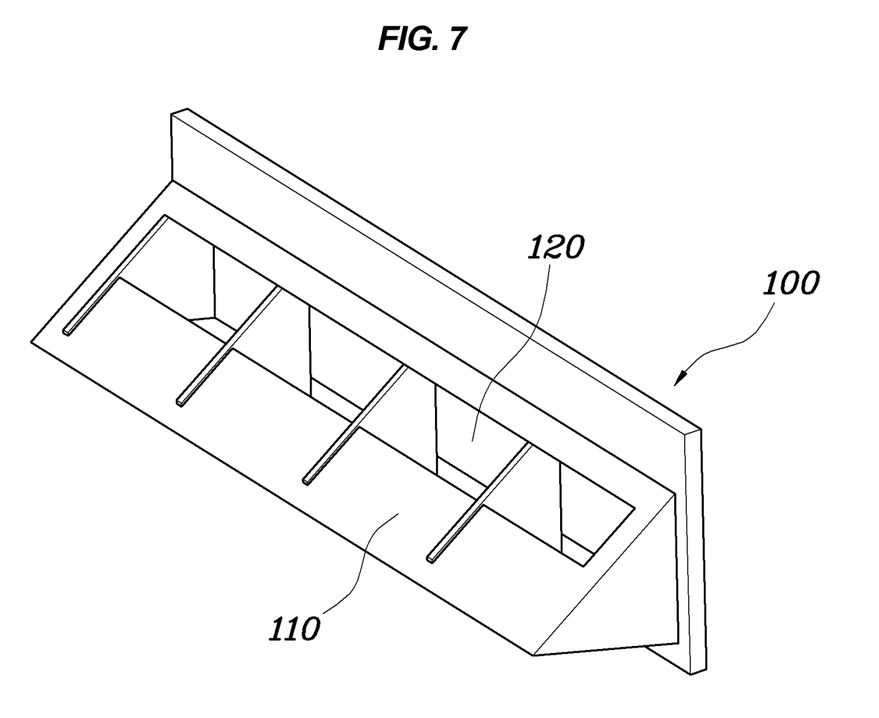
FIG. 7 is a view illustrating both an air filter and an air guide used in the exemplary air filter assembly of the blower for vehicles according to the present invention.

As shown in FIG. 5 through FIG. 7, an air filter assembly 10 of a blower for vehicles according to an exemplary embodiment of the present invention includes an air filter casing 100 and an air filter 200.

The air filter casing 100 receives therein the air filter 200 and is installed in an intake duct 10 having both an outdoor air intake port 11 and an indoor air intake port 12. FIG. 6 shows parts of the air filter casing 100. As shown in FIG. 6, the air filter casing 100 is provided in a first end thereof with an inclined part 110, which is inclined at a predetermined inclination angle. The inclined part 110 is provided with a plurality of subsidiary indoor air intake ports 120 for supplying a predetermined amount of indoor air into the intake duct 10 during outdoor air inlet mode.

The air filter 200 is received in the air filter casing 100 and filters indoor air and outdoor air flowing into the intake duct 10, thus purifying the air. As shown in FIG. 7, the air filter 200 has a shape similar to a conventional air filter except for a rectangular air guide 300, which is integrated with the lower edge of an end of the air filter 200 into a single structure. In the exemplary embodiment, the air guide 300 is integrated with the air filter 200 into a single structure so as to rotate around the lower edge of the end of the air filter 200 and is made of a light material, such as a nonwoven fabric material, so as to be rotated even by a small difference in pressure.

In an exemplary embodiment of the present invention, the air guide 300 may be monolithically integrated with the end of the air filter 200 with an elasticity to close the subsidiary indoor air intake port 120 while a difference between indoor pressure and outdoor pressure of the intake duct is below a predetermined amount.

In another exemplary embodiment of the present invention, the air guide 300 may be pivotally coupled to the end of the air filter 200 to close the subsidiary indoor air intake port 12 with a weight of the air guide 300 while a difference between indoor pressure and outdoor pressure of the intake duct is below a predetermined amount.

Figure 8:
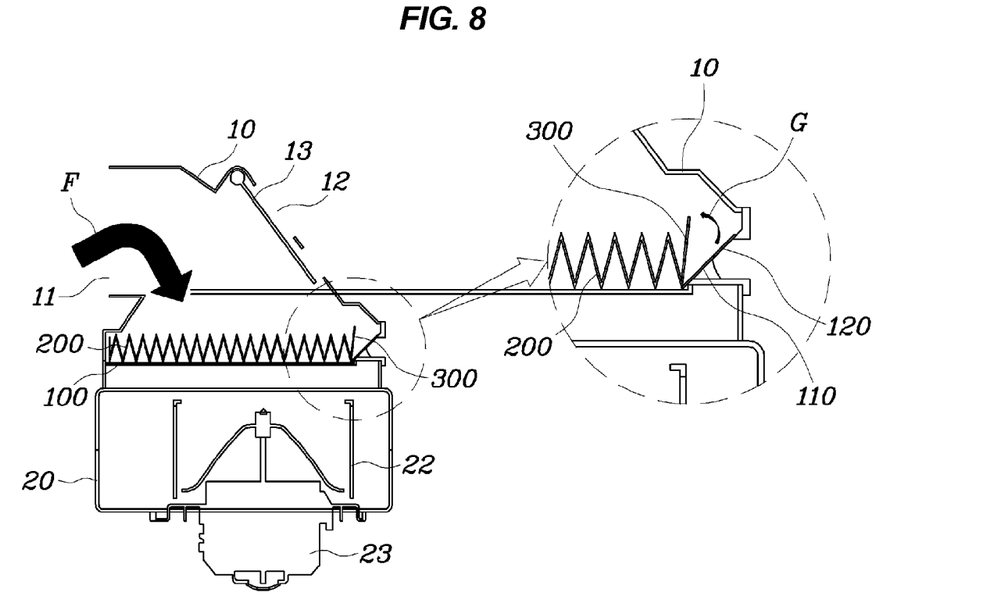
FIG. 8 is a view illustrating operation of the blower for vehicles having the exemplary air filter assembly according to the present invention.

As shown in FIG. 8, when the difference between the indoor and outdoor pressures of the intake duct 10 is not so significant in a state in which the air filter casing 100 has been installed in the intake duct 10 with the air filter 200 received in the air filter casing 100, the subsidiary indoor air intake port 120 is maintained in a closed state.

However, when the outdoor air inlet mode is started, the indoor and outdoor air control door 12 closes the indoor air intake port 12 and the motor 23 rotates the blower fan 22, so that the outdoor air flows in the direction of the arrow F through the outdoor air intake port 11, thus increasing the difference between the indoor and outdoor pressures of the intake duct 10. In the above state, the air guide 300 rotates around the lower edge of the end of the air filter 200 in the direction of the arrow G. In other words, the air guide 300 is moved away from the inclined part 110 of the air filter casing 100 and is in noncontact with the inclined part 110, thus opening the subsidiary indoor air intake port 120. When the subsidiary indoor air intake port 120 is opened as described above, a predetermined amount of indoor air can be supplied into the intake duct 10 during the outdoor air inlet mode, thus reducing the amount of energy required to heat the passenger compartment of a vehicle and increasing heating efficiency.

Hereinbelow, the operational effect of the present invention will be described in detail with reference to Table 1 which shows the heating efficiency of a blower for vehicles having the air filter assembly according to the exemplary embodiment of the present invention which is used in a vehicle.

TABLE 1

| Speed (km/h) | 50 | | 90 | | Idle | |
|---|---|---|---|---|---|---|
| Time (min) | 20 | | 40 | | 50 | |
| Heater spec. | PTC | | PTC | | PTC | |
| Air filter assembly | use | not use | Use | not use | Use | not use |
| Average temp. (° C.) | 17 | 14 | 31 | 28 | 32 | 28 |

Table 1 shows the heating performance of a blower with or without the air filter assembly according to the present invention, which was given by measuring the average temperatures of the passenger compartments of the vehicles while changing the speed and mining time of the vehicles.

When the vehicles are driven at a speed of 50 km/h for 20 minutes, the average temperature of the passenger compartment of a vehicle having the air filter assembly reaches 17° C., which is 3° C. higher than the average temperature 14° C. of the passenger compartment of another vehicle having no air filter assembly.

When the vehicles are driven at a speed of 90 km/h for 40 minutes, the average temperature of the passenger compartment of the vehicle having the air filter assembly reaches 31° C., which is 3° C. higher than the average temperature 28° C. of the passenger compartment of the vehicle having no air filter assembly.

Further, when the vehicles are driven for 40 minutes in an idle state, the average temperature of the passenger compartment of the vehicle having the air filter assembly reaches 32° C., which is higher than the average temperature 28° C. of the passenger compartment of the vehicle having no air filter assembly by 4° C.

Thus, it is noted that, when the air filter assembly of a blower for vehicles according to the exemplary embodiment of the present invention is used in a vehicle, the average temperature of the passenger compartment of the vehicle is increased higher than that of a vehicle having no air filter assembly by about 3° C.

As described above, the air filter assembly of a blower for vehicles according to the exemplary embodiment of the present invention reduces the amount of energy required to heat the passenger compartment of a vehicle, increases heating efficiency, minimizes the structural complication of the blower for vehicles required to realize the above-mentioned effects, thus reducing the production cost and increasing productivity of vehicles.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air filter assembly of a blower for a vehicle, comprising:
   an air filter casing installed in an intake duct having an outdoor air intake port communicating with the outdoor of the vehicle, an indoor air intake port communicating with the indoor of the vehicle, and a subsidiary indoor air intake port communicating with the indoor of the vehicle, wherein the subsidiary indoor air intake port is provided in the air filter casing;
   an air filter received in the air filter casing and purifying indoor air or outdoor air supplied into the intake duct; and
   an air guide integrated with an end of the air filter and opening or closing the subsidiary indoor air intake port so as to guide a predetermined amount of indoor air into the intake duct during an outdoor air inlet mode;
   wherein the air filter casing is provided in an end thereof with an inclined part inclined upwards at a predetermined angle and the subsidiary indoor air intake port is provided in the inclined part;
   wherein the air guide is disposed between the air filter and the inclined part of the air filter casing and moves in contact or noncontact with the inclined part, thus closing or opening the subsidiary indoor air intake port; and
   wherein the air guide is monolithically integrated with a lower edge of the end of the air filter with an elasticity to close the subsidiary indoor air intake port while a difference between indoor pressure and outdoor pressure of the intake duct is below a predetermined amount.

2. The air filter assembly of a blower for a vehicle according to claim 1, wherein the predetermined angle is an acute angle.

3. The air filter assembly of a blower for a vehicle according to claim 1, wherein the air guide rotates around a lower edge of the end of the air filter so as to be in contact or noncontact with the inclined part according to the difference between the indoor pressure and the outdoor pressure of the intake duct.

4. The air filter assembly of a blower for a vehicle according to claim 1, wherein the air guide is pivotally coupled to the end of the air filter to close the subsidiary indoor air intake port with a weight of the air guide while a difference between indoor pressure and outdoor pressure of the intake duct is below a predetermined amount.

5. The air filter assembly of a blower for a vehicle according to claim 4, wherein the air guide rotates around a lower edge of the end of the air filter so as to be in contact or noncontact with the inclined part according to the difference between the indoor pressure and the outdoor pressure of the intake duct.

6. The air filter assembly of a blower for a vehicle according to claim 1, wherein the air guide is made of a nonwoven fabric material.

* * * * *